United States Patent [19]
Miyao et al.

[11] Patent Number: 5,590,812
[45] Date of Patent: Jan. 7, 1997

[54] PRODUCT-DELIVERY DEVICE FOR AUTOMATIC VENDING MACHINES

[75] Inventors: Tetsuya Miyao; Shozo Iwamoto; Kozo Matsushima; Koji Kawakami; Masaki Inoue, all of Mie, Japan

[73] Assignee: Fuji Electric Co., Ltd., Kawasaki, Japan

[21] Appl. No.: 419,644

[22] Filed: Apr. 10, 1995

[30] Foreign Application Priority Data

Apr. 18, 1994 [JP] Japan .................................. 6-078432
May 30, 1994 [JP] Japan .................................. 6-115797

[51] Int. Cl.$^6$ .................................................. B65G 59/00
[52] U.S. Cl. ........................................ 221/112; 221/121
[58] Field of Search ............................... 221/112, 118, 221/119, 121, 218, 277, 253, 6

[56] References Cited

U.S. PATENT DOCUMENTS

2,864,532  12/1958  Gabrielsen ........................... 221/112
3,838,663  10/1974  Focke .................................. 221/6
4,566,581  1/1986  Martin ................................. 221/6

Primary Examiner—Kenneth Noland
Attorney, Agent, or Firm—Kanesaka & Takeuchi

[57] ABSTRACT

A product-delivery device for an automatic vending machine is designed to deliver products stacked and accommodated in a product-accommodating box sequentially from a lowest position according to a sales command. The produce-delivery device is formed of at least one horizontal conveyer installed on a lower side of the product-accommodating box, and a product delivery opening formed at a lower front port of the box. The products are piled on the conveyer. The opening has a size to allow one of the products to pass therethrough. Thus, the products disposed on the conveyer are delivered forward one by one from the box by means of the conveyer according to the sales command. In the product-delivery device, the thickness of a cabinet can be reduced, and the product accommodation efficiency is improved.

13 Claims, 8 Drawing Sheets

PRODUCT-DELIVERY DEVICE FOR AUTOMATIC VENDING MACHINES

BACKGROUND OF THE INVENTION AND RELATED ART STATEMENT

The present invention relates to a product-delivery device for an automatic vending machine that sells boxed products, such as cigarettes.

Figure 13:
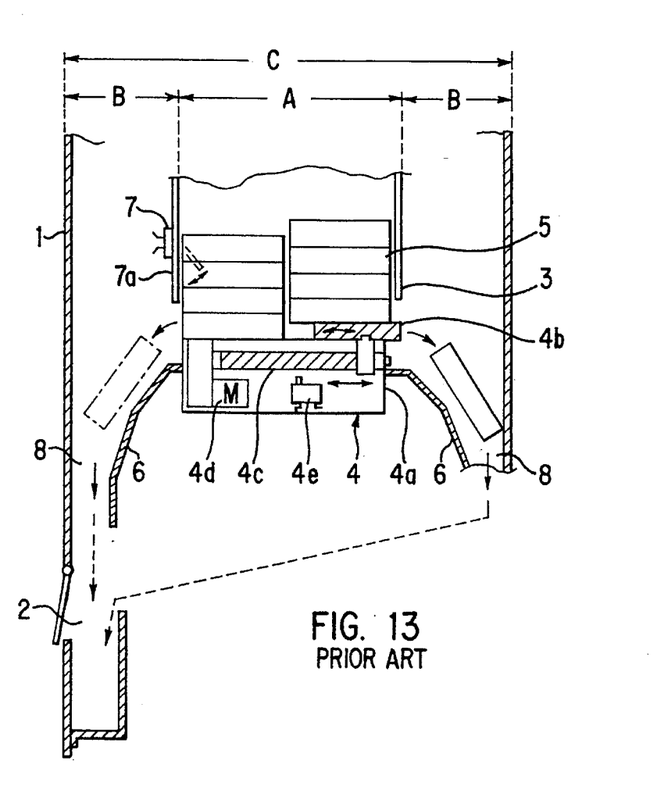
FIG. 13 is an explanatory section view of a conventional product-delivery device mounted in an automatic vending machine delivering boxed products.

First, a conventional structure of a product-delivery device mounted on the above-mentioned automatic vending machine delivering boxed products is shown in FIG. 13. In this figure, numeral 1 is a cabinet for the automatic vending machine; 2 indicates a product take-out opening in the front thereof; 3 indicates a product-accommodating box installed in the storage compartment of the cabinet 1; and, 4 indicates a pusher-type vending mechanism assembled at the underside of the product-accommodating box 3. Boxed products 5, such as cigarettes, are stacked and accommodated on a stage of the vending mechanism 4 arranged in the forward and backward positions. The pusher-type vending mechanism 4 is formed of a base stand 4a, a pusher 4b protruding on the stage on the base stand 4a, a Napier screw 4c to threadably push the pusher 4a in and out, a driving motor 4d, and a pusher position-detecting switch 4e.

A product-delivery device using this type of pusher-type vending mechanism 4 is known already. With this mechanism, the products 5 piled in the forward and backward positions are delivered alternately to the forward and backward directions from the product-accommodating box 3 by operating the pusher 4b to move forward and backward alternately in response to each sales command, so that the product 5 is delivered through the product exit 2 via a chute 6. In addition, the product-accommodating box 3 has a sold-out detection switch 7, from which an actuator 7a protrudes into the product-accommodating box to detect the availability of the products, and stops sales when a sold-out signal is issued.

The conventional product-delivery device that uses a pusher-type vending mechanism has the following problems:

(1) If the products 5 are accommodated in forward and backward rows in the product-accommodating box 3 as shown in FIG. 13, since the products 5 are delivered from the forward and backward directions by the reciprocal motion of the pusher 4b, it is necessary to arrange the product-accommodating box 3 and the pusher-type vending mechanism 4 in the center of the automatic vending machine, and to assure at both sides thereof product delivery paths 8 via the chutes 6. In other words, if the depth of the product-accommodating box 3 is taken as A and the width of the product delivery path is taken as B, then the cabinet 1 of the automatic vending machine should have a depth of C made up of at least A+2B.

This requires an increased cabinet depth, which is a large obstacle to reduce the depth of the automatic vending machine. Especially, extension or protrusion of the automatic vending machine into the road has recently become a social problem.

(2) Even if the products 5 are stacked and accommodated in a single row in the product-accommodating box 3, it is necessary to provide an extra space, i.e. escape space, behind the vending mechanism 4 for the pusher 4b to move behind the product-accommodating box 3, thus restricting the reduction of the thickness of the automatic vending machine.

(3) It is impossible to accommodate and deliver the products 5 from the product-accommodating box more than three rows because of the operating principle of the pusher-type vending mechanism.

(4) Because the pusher 4b protrudes over the stage of the vending mechanism 4, if the number of products stacked and accommodated in the product-accommodating box 3 decreases, the products 5 stacked on the pusher become inclined as a result of backward movement of the pusher, and slide out from the product delivery opening in the product-accommodating box, resulting in erroneous product delivery. Therefore, in the conventional vending machines, the actuator 7a in the sold-out detection switch 7 detects the availability of the products stacked on the third level from the bottom as shown in the figure, and a product sold-out signal is outputted when there are still four product items, i.e. two each on the forward and backward rows, which are enough to prevent the stacked product from being inclined due to the backward movement of the pusher, if four product items remain. However, this operation is less advantageous though the number of the products remaining in the box that could have been sold is reduced.

(5) The pusher-type vending mechanism 4 has a complex pusher driving mechanism, and it is so large that it occupies a large space in the storage compartment, thereby reducing product-accommodating efficiency.

In Japanese Utility Model Publication (KOKAI) No. 2-63184 and Japanese Patent Publication (KOKAI) No. 3-149692, products are placed on a plate with a slit, and an endless belt with a pusher is located under the plate. The pusher extending through the slit pushes the product. The prior art can not effectively utilize the space in the machine.

The present invention has been made to solve the above problems, and it is an object of the invention to provide a new product-delivery device for an automatic vending machine delivering boxed products, wherein the cabinet of the automatic vending machine is made thinner, and the product-accommodating efficiency is improved.

SUMMARY OF THE INVENTION

In order to achieve the above objects, the present invention has been made such that a horizontal conveyer is installed on the lower side of a product-accommodating box, which is open at the bottom, to stack and load products on the conveyer; a product delivery opening is formed at the lower front part of the product-accommodating box to allow one product to pass; and the product is delivered forward one at a time from the product-accommodating box by means of the transporting motion of the conveyer according to a sales command.

The product-delivery device, which has the above-mentioned structure, is constructed by specifically adding the following requirements:

(1) The products are stacked and accommodated in the forward and backward positions, and the same number of independent belt conveyer mechanisms as the product rows is disposed in the forward and backward positions on the lower side of the product-accommodating box.

(2) In the structure described in the above item (1), a difference in level, i.e. height, is set between the belt conveyer mechanisms lying forward and backward in series, so that the belt surface of the backward portion is slightly lower than the belt face of the forward portion.

(3) In the structure described in the above item (1), a sold-out detection switch, which is a swingable actuator and is vertically oriented in an arbitrary position, is disposed on the product delivery opening of the product-accommodating box.

(4) In the structure described in the above item (1), a delivery detection switch, which a swingable actuator and becomes horizontal in an arbitrary position, is disposed on the forward side of the product-delivery opening of the product-accommodating box.

(5) The products are stacked and accommodated in the forward and backward positions in the product-accommodating box, and a conveyer mechanism formed with a raised portion and a lowered portion on its circumference with a pitch matching the product arrangement is disposed at the lower side of the product-accommodating box.

(6) In the structure described in the above item (5), the conveyer mechanism is a belt conveyer mechanism, with a raised portion and a lowered portion formed on the circumference of the belt by varying the belt thickness.

(7) In the structure described in the above item (5), the conveyer mechanism is a chain conveyer mechanism, with a raised portion and a lowered portion formed on the circumference of a chain by varying the height of link segments that link chain pins together.

(8) In the structure described in the above item (5), a delivery-detection switch and a sold-out detection switch are incorporated with actuators protruding from the product-delivery end face and the product-loading face relative to the conveyer mechanism.

(9) In the structure described in the above item (5), an elastic plate decelerator to decrease the speed of the product when delivered is disposed on the product-delivery outlet in the product-accommodating box.

(10) In the structure described in the above item (7), the lengths of the raised and lowered portions can be set variably to match the size of the products by attaching height-adjusting adapters to the link segments in the lowered portion.

In the above structure, when the conveyer starts operating upon receiving a sales command with the products accommodated in the product-accommodating box and stacked on the horizontal conveyer, the product placed on the lowest level is moved forward while passing through the opening in the product-accommodating box, and is dropped and delivered. Even if the products are accommodated in the front and back rows in the product-accommodating box, the products placed in the back row can be conveyed forward by the conveyer as in the products in the front row, and delivered by passing through the product-delivery opening. This arrangement eliminates the need to provide a product-delivery path on the back side of the product-accommodating box, and the depth therefor can be reduced, thereby providing a thinner automatic vending machine.

In addition, the belt conveyer mechanisms are arranged in series in the forward and backward directions for a number corresponding to the number of the rows of the piled products accommodated in the product-accommodating box, and each belt conveyer mechanism is individually controlled according to the order of sales of the products. Thus, it is possible to deliver the products according to a predetermined order from each product row. In this case, a difference in level is provided between the belt conveyer mechanisms laid in the front and back rows so that the belt surface for the back row is slightly lower than that in the front row. Thus, the product conveyed on the belt from the back abuts against the end of the product stacked in the front row on the second level from the bottom, and without stopping at the point, the product slips under the product at the front row and is conveyed forward by the belt. Thus, the products are delivered in the predetermined order while retaining a stable attitude without causing any product jamming.

On the other hand, in the structure that adopts a belt-type or chain-type conveyer mechanism, in which the raised portion and the lowered portion are formed on the circumference of the belt or the chain which has a pitch matching the product arrangement, and which is disposed at the lower side of the product-accommodating box where the products are stacked and accommodated in the forward and backward rows or positions, the product-delivery movement is performed in the following manner. Namely, when the conveyer mechanism is activated by a sales command, the product placed on the raised portion of the conveyer mechanism is moved against the elastic plate decelerator disposed at the product-delivery opening, and stops there temporarily. Then, the product is pushed out from the decelerator through the product-delivery opening by the succeeding product disposed on the lowered portion and conveyed forward. When the delivery-detection switch is turned on during this conveying motion, the conveyer mechanism stops at that position so that the product placed on the lowered portion stands by in the sales standby position. Because in this conveying motion, there is a slight difference in the level between the raised portion and the lowered portion, the product placed on the lowered portion slips under the product placed on the second product on the raised portion. Hence, there is no fear that the products are not conveyed because the products stick together.

At the next sale, the product placed on the lowered portion of the conveyer mechanism is pushed forward by the raised portion on the conveyer mechanism that is moving from behind, and is thereby conveyed forward. The product placed on the raised portion and the lowered portion are conveyed alternately at each sales thereafter in the same manner as described. When the inventory in the product-accommodating box is exhausted and a sold-out condition is registered, the sold-out detection switch detects a "no product" condition, and flashes a sold-out indication.

Additionally, in the chain-type conveyer mechanism, a height-adjusting adapter may be disposed in the link segment in the lowered portion, so that when the products are exchanged between long and large products and small and short products, the adapter can be used to properly set the length between the raised portion and the lowered portion according to the sizes of the products.

DETAILED DESCRIPTION OF PREFERRED EMBODIMENTS

Hereunder, the various embodiments of the present invention are explained with reference to the appended drawings.

FIGS. 1, and 2(a)–2(d) show a first embodiment, in which products 5 are accommodated in two, i.e. front and back, rows in a product-accommodating box 3, and two horizontal belt conveyer mechanisms 9A and 9B are disposed as a product-delivery device according to the length of the products 5 at the bottom of the product-accommodating box 3. This belt conveyer mechanism is formed of an endless belt 9a stretched between pulleys and a driving motor 9b linked to one of the pulleys. The products 5 are stacked on each of the belts 9a in the front and back rows.

Figure 1:
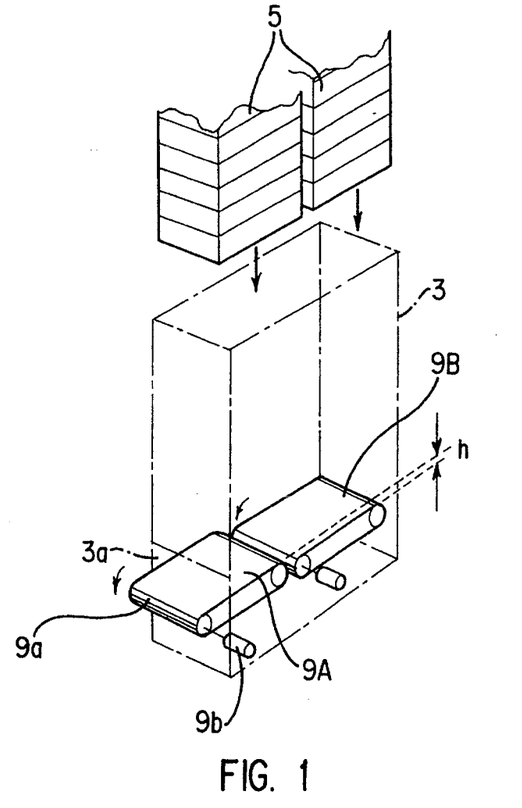
FIG. 1 is a perspective view for showing an arrangement of a product-delivery device forming a two-row vending mechanism according to a first embodiment of the present invention.

A difference in level or height "h" is provided between the belt conveyer mechanisms 9A and 9B, the former being placed in front of the latter, so that the surface of the back belt is slightly lower than that of the front belt. In addition, a product-delivery opening 3a that allows one product 5 to pass therethrough is opened at the lower front portion of the product-accommodating box 3, and the height of the opening is set specifically to D≈1.5 d at the product-delivery opening, where "d" is the thickness of the product. The belt conveyer mechanisms 9A and 9B are operated and can be shut down individually by a command from the control section, which is not shown.

Figure 2A:
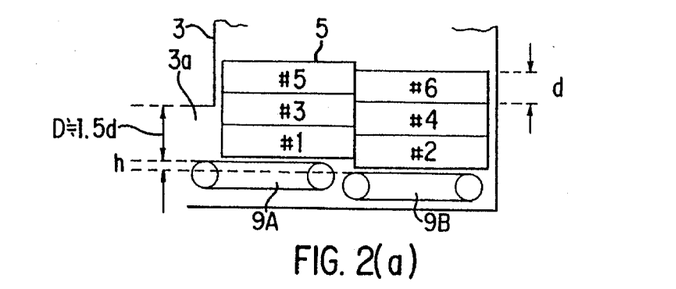
FIGS. 2(a)–2(d) are explanatory views for product-delivery movements according to the embodiment shown in FIG. 1.
Figure 2B:
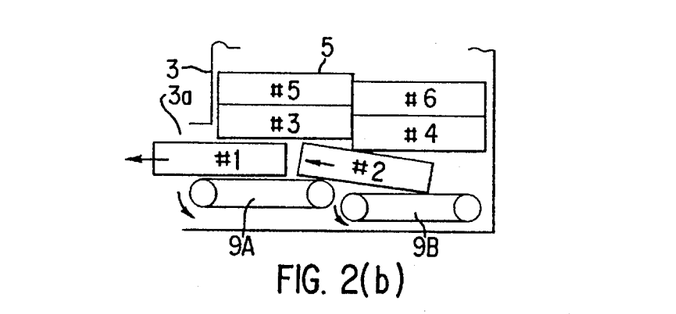

Next, the product-delivery operation according to the above structure is explained by referring to FIGS. 2(a) through 2(d). Symbols #1 to #6 in the figures indicate the order of delivery of the products 5. FIG. 2 (a) shows a sales standby condition. When the belt conveyer mechanisms 9A and 9B are activated synchronously in the direction marked by the arrows when a sales command is received, as shown in FIG. 2(b), the product #1 is conveyed on the belt by the belt conveyer mechanism 9A in the front position, and is delivered through the product delivery opening 3a in the product-accommodating box. At the same time, the product #2 placed on the belt conveyer mechanism 9B in the back position is transferred to the belt conveyer mechanism 9A following the product #1 by slipping beneath the product #3 stacked on the conveyer mechanism 9A in the front position by utilizing the previously described difference in level "h" between the belts.

Figure 2C:
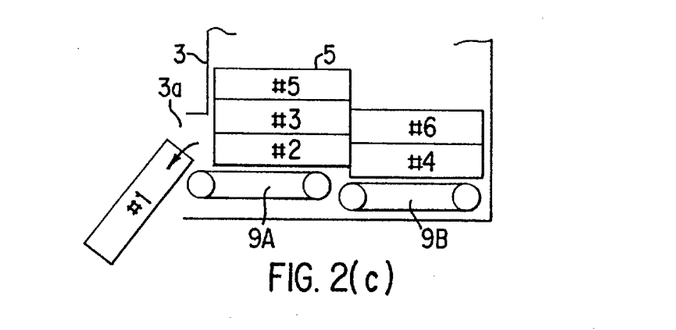
Figure 2D:
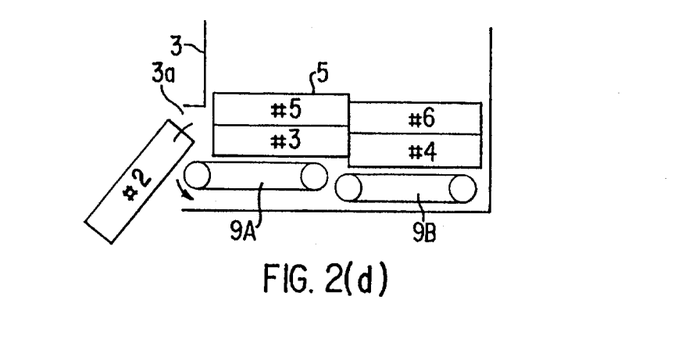

Then, the product #1 drops down in a forwardly inclined manner from the front tip of the belt conveyer mechanism 9A as shown in FIG. 2(c), while the product #2 moving from the back belt conveyer mechanism 9B continues to ride on the belt conveyer mechanism 9A, thereby completing one vending operation. Successively, during a second sales, only the belt conveyer mechanism 9A in the front position is rotated while the belt conveyer mechanism 9B remains stopped. This allows the product #2 to be conveyed forward through the product-delivery opening 3a. Thereafter, by repeating this same operation, the products after the product #3 placed in the front and back belt mechanisms in the product-accommodating box 3 are delivered alternately in a predetermined order at each sale.

Figure 3:
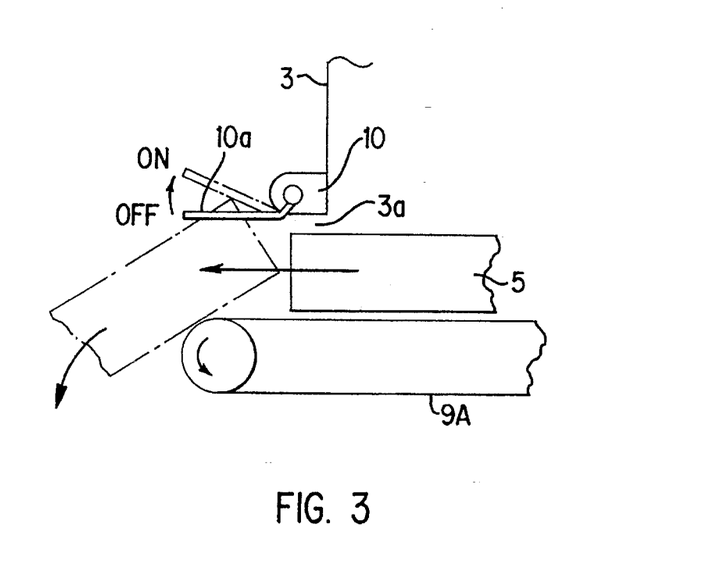
FIG. 3 is an explanatory side view for illustrating the structure and detection movement of a delivery-detection switch disposed in the embodiment shown in FIG. 1.
Figure 4:
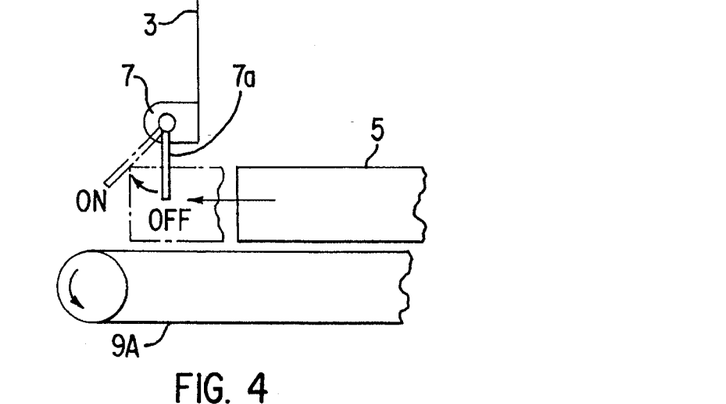
FIG. 4 is an explanatory side view for illustrating the structure and detection movement of a sold-out detection switch disposed in the embodiment shown in FIG. 1.

The product-accommodating box 3 is provided with a product-delivery detection switch 10 and a sold-out detection switch 7, arranged as shown in FIGS. 3 and 4. The delivery-detection switch 10 is disposed in the front upper portion of the product-delivery opening 3a in the product-accommodating box 3 as shown in FIG. 3. It is arranged such that a swingable actuator 10a becomes horizontal in an arbitrary position. When a product 5 starts sliding forwardly in a forwardly inclined posture from the front end of the belt conveyer mechanism 9A as a result of a product-delivery operation, this posture makes the back end of the product 5 kick up the actuator 10a to turn the delivery-detection switch on temporarily. Then, when the product 5 drops down, the actuator 10a returns to the standby position, and turns the switch off. Therefore, the delivery of the product 5 can be confirmed precisely from the ON/OFF operation of the delivery-detection switch 10 associated with the delivery of the product 5.

Furthermore, in FIG. 4, the sold-out detection switch 7 is disposed at the product-delivery opening 3a in the same manner as in the delivery detection switch 10, and its swingable actuator 7a is ready to droop in an arbitrary position. After the delivery of the product 5 is confirmed by the delivery-detection switch 10 in FIG. 3 (at that time, the actuator 7a in the sold-out detection switch returns to the dropping position, and the switch 7 is in the off position), if the belt conveyer mechanism 9A is rotated for a short time to move the product 5 forward, the product pushes the actuator 7, and the sold-out detection switch 7 moves to the on position when a succeeding product is available. In contrast, if no more product is available, that is, if the products have been sold out, the switch 7 remains turned off even if the belt conveyer mechanism 9A is rotated to thereby indicate that the products have been sold out.

Figure 5A:
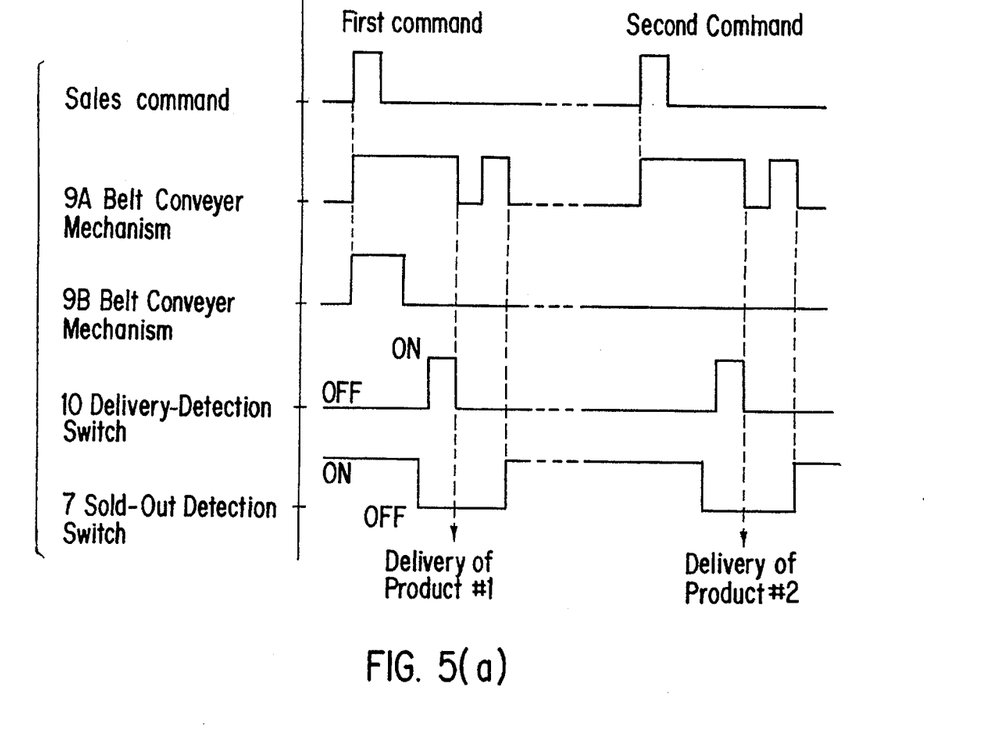
FIG. 5(a) is time charts for a typical vending movement corresponding to product-delivery movements shown in FIGS. 2(a)–2(d)
Figure 5B:
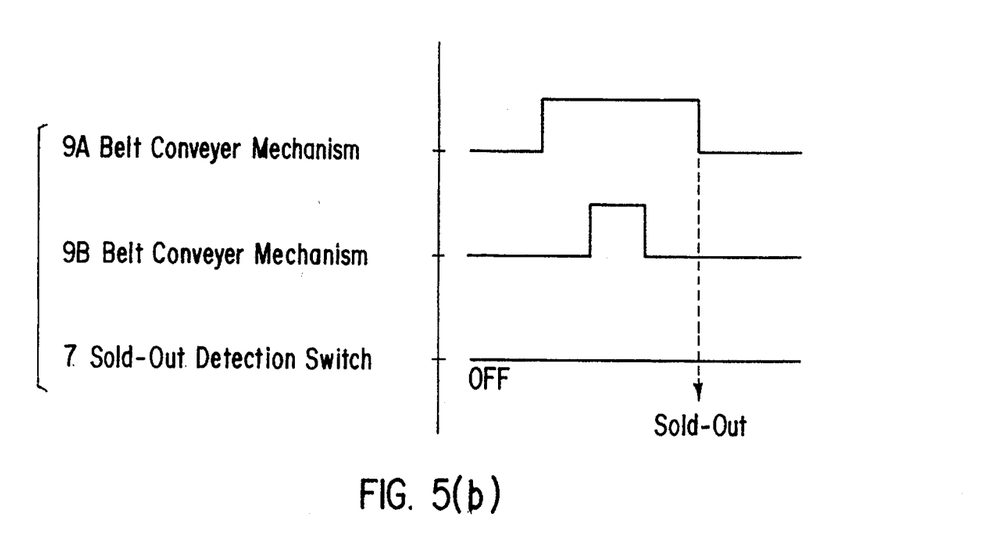
FIG. 5(b) is a time chart for the sold-out detection movement thereof.

Next, a control operation for the product delivery carried out by the delivery-detection switch 10 and the sold-out detection switch 7 is explained by reference to the time charts shown FIGS. 5(a) and 5(b). First, FIG. 5(a) shows a sale operation when there are at least two products in the product-accommodating box, wherein the belt conveyer mechanisms 9A and 9B are simultaneously actuated as illustrated in FIG. 2(b) upon the receipt of a first sales command. At this time, the delivery-detection switch 10 turns on temporarily, and when it turns off again, the product

1 is judged to have been delivered, so that the belt conveyer mechanisms 9A and 9B are stopped temporarily. Thereafter, only the belt conveyer mechanism 9A is activated in the forward position again for a short time, and the conveyer mechanism 9A is eventually stopped in a sale standby condition when the sold-out detection switch 7 turns on upon the arrival of the next product #2. Then, when a second sales command is issued, only the belt conveyer mechanism 9A in the front position is rotated to deliver the product #2, whereas the same control is carried out when operation signals are received from the delivery-detection switch 10 and the sold-out detection switch 7.

When the product-accommodating box becomes empty and shows a product sold-out condition, the products are judged to have been sold out via the following process. Namely, if the sold-out detection switch 7 remains turned off even if the belt conveyer mechanism 9A in the forward position is rotated over a specific time period, and further the belt conveyer mechanism 9B in the back position is also rotated, the product is judged to have been sold out, so that a sold-out signal is issued. Thus, all the products 5 accommodated in the product-accommodating box 3 are sold.

Figure 6:
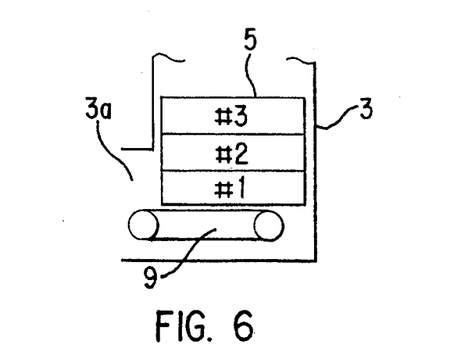
FIG. 6 is an explanatory side view for showing an arrangement of a product-delivery device forming a single-row vending mechanism according to a second embodiment of the present invention.

FIG. 6 shows a second embodiment of a single-row vending mechanism, wherein one belt conveyer mechanism 9 is arranged beneath the product-accommodating box 3, and the products 5 are stacked and accommodated in one row on the belt conveyer. With this structure, the belt conveyer mechanism 9 is operated and controlled in response to each sales command so that the products 5 are delivered out sequentially from the lowest level. Moreover, because there is no need to provide an escape space for the pusher behind the product-accommodating box as in a pusher-type vending mechanism, the thickness of the automatic vending machine can be reduced for that space.

Figure 7:
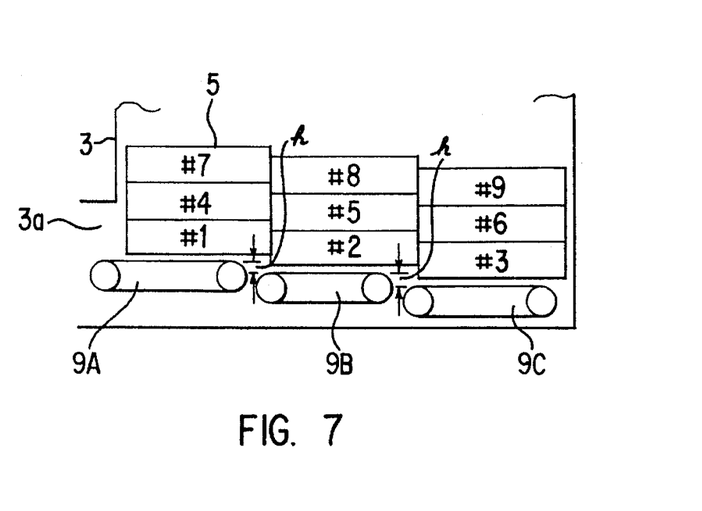
FIG. 7 is an explanatory side view for showing an arrangement of a product-delivery device forming a three-row vending mechanism according to a third embodiment of the present invention.

FIG. 7. shows a third embodiment of a three-row vending mechanism, which has the products 5 lined up in three rows in the product-accommodating box 3, wherein three belt conveyer mechanisms 9A, 9B and 9C are serially arranged beneath the product-accommodating box 3 in the front and back directions, and a difference in level "h" is provided as described earlier in the first embodiment.

Figure 8:
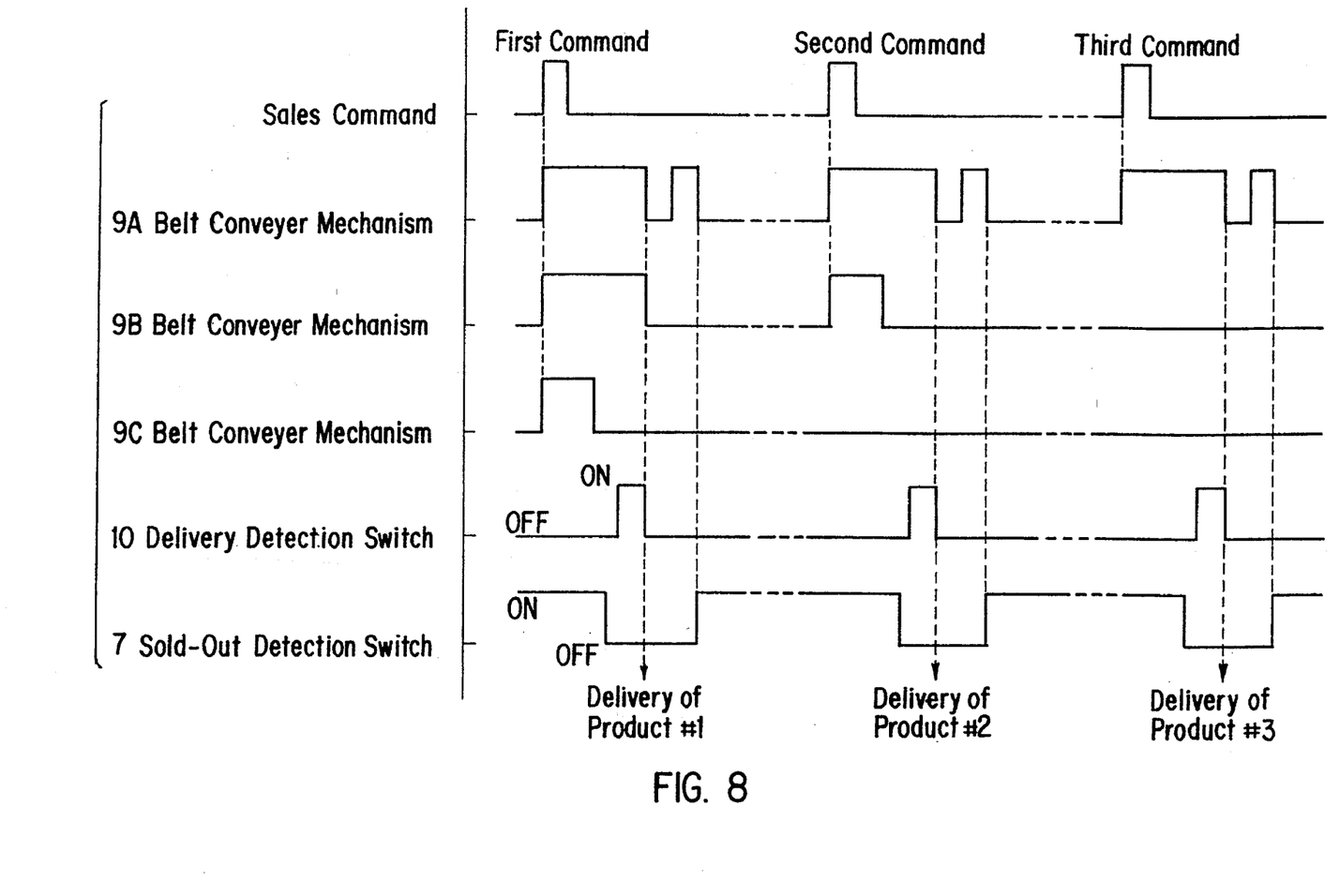
FIG. 8 illustrates a time chart for the sales control mechanism shown in FIG. 7.

With this structure, which has the product-delivery detection switch 10 combined with the sold-out detection switch 7, the belt conveyer mechanisms 9A through 9C are operated and controlled in correspondence with first, second and third sales commands as shown in the time chart in FIG. 8. Namely, in the first sales, the conveyer mechanisms 9A, 9B and 9C are actuated to deliver the products forwardly, and in the second sales, the conveyer mechanisms 9A and 9B are actuated. In the third sales, the conveyer mechanism 9A is only actuated. Therefore, the products 5 lined up in the front and back directions are delivered and sold in the order of the products #1, #2 and #3. Thereafter, by repeating this vending operation, all the products can be sold.

FIGS. 9(a)–9(d) show a fourth embodiment of a system different from the above-mentioned embodiments, in which the products 5 are lined up in two rows in the front and back directions of the product-accommodating box 3. In the present embodiment, one horizontal belt conveyer mechanism 9' is arranged beneath the product-accommodating box 3, and the products 5 (#1 through #8) are placed in two rows in the front and back directions on the belts. An endless belt 9a stretched between the pulleys in the front and back of the belt conveyer mechanism 9' is divided in four zones along the length of the belt, where two raised portions 9H and two lowered portions 9L are placed alternately along the endless belt 9a, with the pitches according to the arrangement of the products 5 which are lined up in the front and back directions.

Figure 9A:
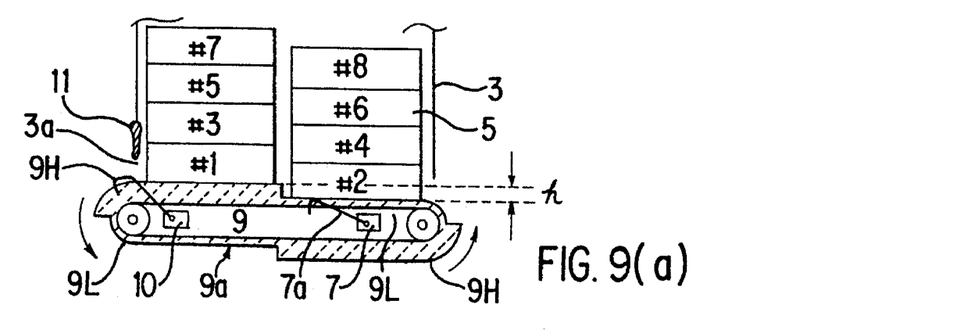
FIGS. 9(a)–9(d) are explanatory views for product-delivery movements of a two-row vending mechanism according to a fourth embodiment.

In this case, the raised portions 9H and the lowered portions 9L are formed with different heights by changing the thickness of the belt 9a, wherein the same difference in level "h" is provided between the raised portion 9H and the lowered portion 9L as in the first embodiment. The divided zones on the raised portions 9H and the lowered portions 9L are made slightly longer than the products 5. The belt 9a is made of rubber, for example, and in order to allow the raised portion 9H with a larger thickness to bend freely around the pulleys, the surface of the belt on the raised portion 9H has slits in a fine pitch in the direction of the width.

At the same time, a delivery-detection switch 10 and a sold-out detection switch 7 are assembled in the belt conveyer mechanism 9, wherein the tip of an actuator 10a of the delivery-detection switch 10 is loaded with a spring so that it protrudes in front of the product-delivery opening 3a, and the tip of an actuator 7a of the sold-out detection switch 7 is loaded with a spring so that it protrudes beneath the products 5 lined up in the back row. Furthermore, in the product-delivery opening 3a of the product-accommodating box 3, an elastic plate decelerator 11, which is made of, for example, polyester resin or rubber, is fitted so that it protrudes into the product-delivery path.

Next, the product-delivery operation using the above structure is explained with reference to FIGS. 9(a) through 9(d). First, FIG. 9(a) illustrates a sales standby condition, where the products #1, #3, #5 and #7 lined up in the front row in the product-accommodating box 3 are placed on the raised portion 9H of the belt conveyer mechanism 9, and the products #2, #4, #6 and #8 lined up in the back row are placed on the lowered portion 9L so that they are located lower than the products in the front row. The sold-out detection switch 7 detects, i.e. the switch is turned on, a "products available" condition as the actuator 7a is pushed by the product #2, and the actuator 10a in the delivery-detection switch 10 protrudes toward the front of the product-delivery opening 3a to keep the switch off.

Figure 9B:
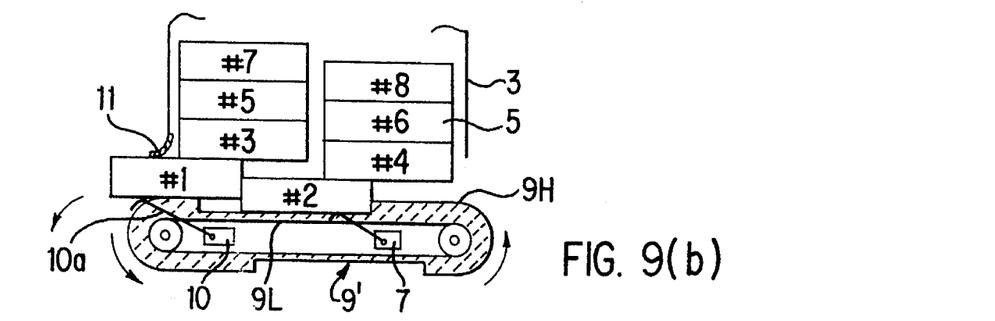

When the belt conveyer mechanism 9 starts to move from this sales standby condition upon receiving a first sales command, the products #1 and #2 placed on the raised portion 9H and the lowered portion 9L are simultaneously conveyed forward on the belt. When the front tip of product #1 hits the decelerator piece 11 during this conveying process, the forward movement of product #1 is blocked to cause the product to stop at that position temporarily. However, when the next product #2 placed on the lowered portion 9L moves toward that position because it is pushed by the raised portion 9H behind it, the product #2 enters beneath the product #3 to line up on the product #1 and pushes the product #1 from behind as shown in FIG. 1 (b). As a result of these movements, the product #1 passes through the produce-delivery opening 3a while pushing the decelerator 11 to open, and then drops down from the front end of the conveyer mechanism 9'. The product is sent out to the product exit via a chute, which is not shown.

In addition, such product delivery causes the actuator 10a in the delivery-detection switch 10 pushed by the product #1 to turn the switch on and off temporarily, so that the belt conveyer mechanism 9 is stopped to thereby complete one vending operation. When this sale is completed, the product #2, which has been placed on the lowered portion 9L, is now positioned in the sales standby position at the lowest level of the front row, and the product #4, which is in the lowest level of the back row, is now positioned on the raised portion 9H.

Figure 9C:
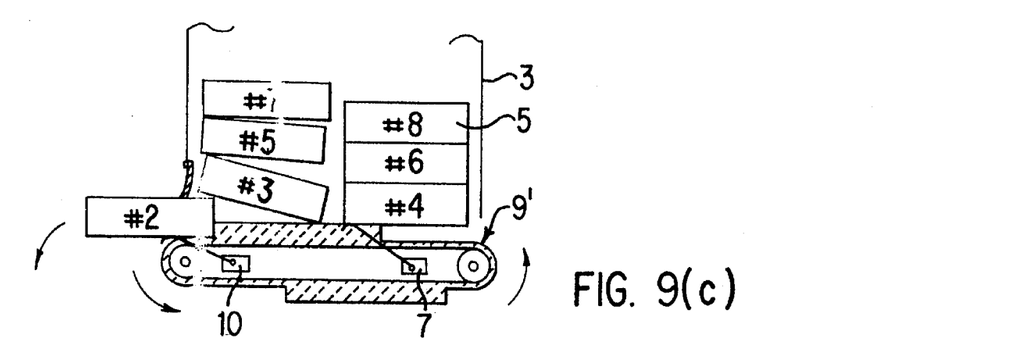

Next, when the belt conveyer mechanism starts to move upon receipt of a second sales command, the product #2, which is placed on the lowered portion 9L, is pushed out by the raised portion 9H that has moved from behind, as shown in FIG. 9(c), and is delivered forward through the product-delivery opening 3a. At the same time, associated with this delivery movement, the product #3 in the front row is placed on the raised portion 9H, and the product #4 in the back row is placed on the lowered portion 9L to return again to the accommodating condition shown in FIG. 9(a). In this movement, since the product #4 on the raised portion 9H is blocked by the product #3, the product #4 changes from the raised portion 9H to the lowered portion 9L.

Figure 9D:
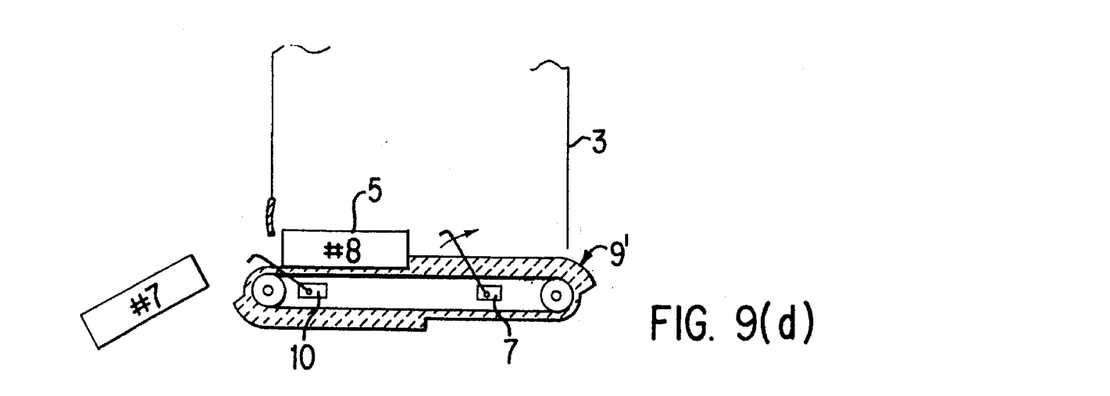
Figure 10:
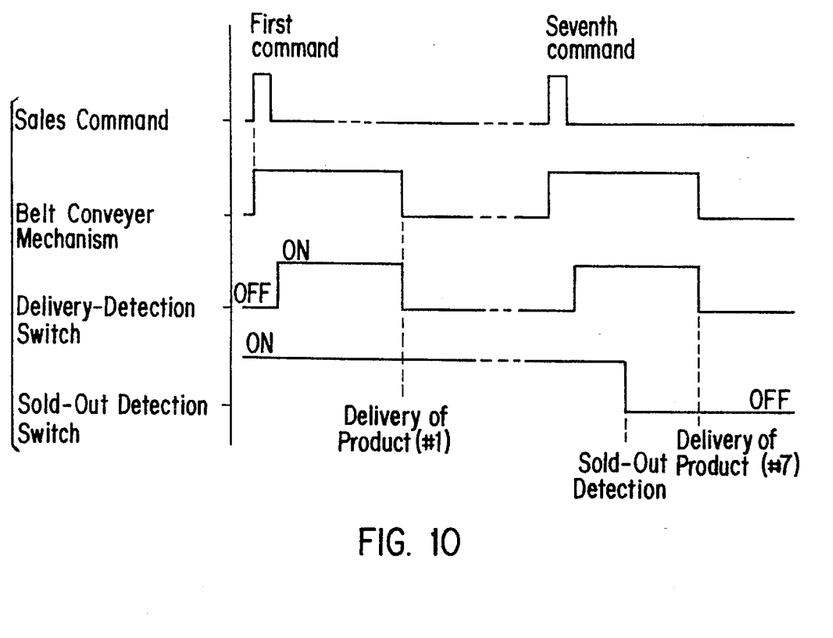
FIG. 10 illustrates a time chart for the product-delivery movement and sold-out detection shown in FIG. 9.

Thereafter, by repeating the above-mentioned movements when a new sales command is received, the products #3 through #8 are delivered according to the predetermined order. When the product #7 is delivered upon receipt of a seventh sales command, the last product #8 moves from the back row to the sales standby position in the front row, as shown in FIG. 9(d), to become empty in the back row of the product-accommodating box 3. Thus, the actuator 7a of the sold-out detection switch 7 becomes free to detect a condition of the "no products" and to issue a sold-out signal. FIG. 10 illustrates the above-mentioned product-delivery movements in the form of a time chart.

While the illustrated example has the sold-out detection switch 7 installed in a position opposite to the product in the back row so that a sold-out signal is issued when one product 5 remains in the product-accommodating box 3 to refill the products without mistake of the brand name, if this sold-out detection switch 7 is disposed such that it can detect the product lined up in the front row, the last product can be sold without leaving any stock in the product-accommodating box 3.

FIGS. 11(a), 11(b) and 12(a)–12(d) illustrate a fifth embodiment, which is a modified example of the fourth embodiment. The present embodiment adopts a chain conveyer mechanism 12 as a horizontal conveyer to deliver the products rather than the belt conveyer mechanism 9 used in the fourth embodiment. The chain conveyer mechanism 12 is formed of a product-delivery chain 14 stretched between a pair of sprockets 13 in the front and back, and a driving motor 16 linked with the sprockets 13 via a gear 15 and having a sold-out detection switch 7 and a delivery-detection switch 10 assembled inside the mechanism, similar to those used in the fourth embodiment.

The chain 14 is formed with link segments in the resin-formed linking plates in place of the ordinary roller chain, and the upper surfaces of the link segments are used for the mounting surface of the products 5. Namely, the upper surfaces are divided into raised portions 14H and the lowered portion 14L provided with a difference in level "h" between them, which are formed alternately with the pitches matching the length of products 5 mounted in the front and back rows around the circumference of the chain 14, similar to the belt conveyer mechanism used in the fourth embodiment. The chain 14 is formed of a combination of link segments for the raised portion with a greater height 14a (segment height "A") for the raised portions, and link segments with lesser height 14b (segment height "B") for the lowered portions as shown in FIGS. 12(a)–12(d), the segments being lined up with pins 14c. A part 14d is a roller that has the pin 14c inserted therein.

Figure 11A:
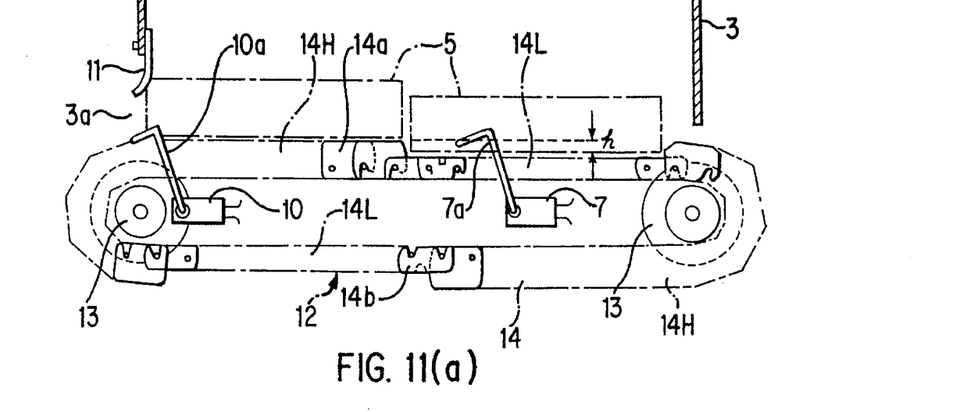
FIG. 11(a) is a side view of a product-delivery device with a chain conveyer corresponding to a two-row vending mechanism in a fifth embodiment of the present invention.
Figure 11B:
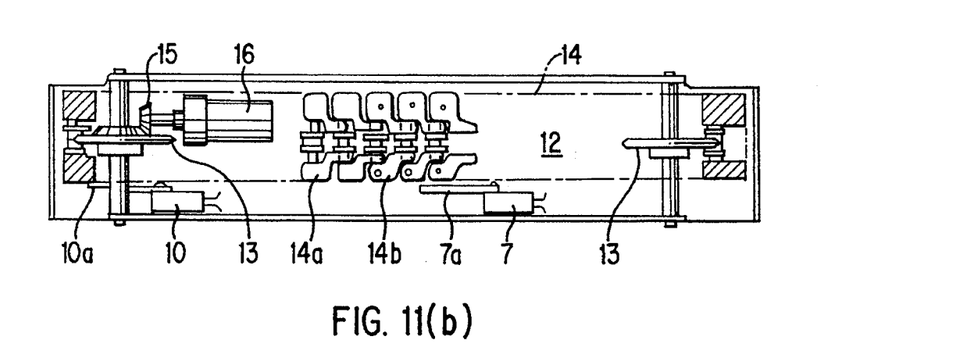
FIG. 11(b) is a plan view thereof.

The movements of the product-delivery device that adopts the chain conveyer mechanism 12 with the above structure are exactly the same as those in the fourth embodiment, where the products 5 accommodated in the product-accommodating box 3, which are divided into the front and back rows, can be delivered forward through the product-delivery opening 3a in the product-accommodating box 3 one by one to fill each order in a predetermined order.

Figure 12A:
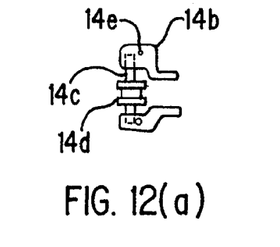
FIG. 12(a) is a plan view of a link segment for a lowered portion.
Figure 12B:
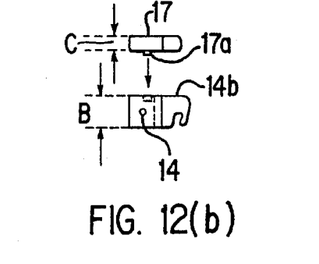
FIG. 12(b) is a side view of FIG. 12(a) shown together with a height adjustment adapter.
Figure 12C:
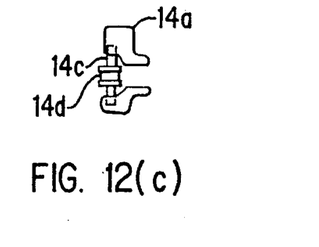
FIG. 12(c) is a plan view of the link segment for a raised portion.
Figure 12D:
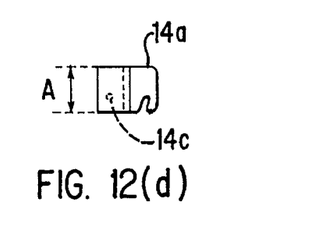
FIG. 12(d) is a side view of FIG. 12(c)

In addition, this embodiment has a height-adjusting adapter 17 to the link segment 14b in the lowered portion, as shown in FIG. 12(b). This adapter 17 is a resin-formed block, wherein the height C is made to match the difference in the level "h", so that it fills the difference in the height of the raised portion and the lowered portion (A-B). It is used by inserting a pin 17a protruding beneath the adapter into a pin-hole 14e drilled on the link segment 14b.

In other words, if the product 5 is exchanged for a shorter product and the lowered portion 14L remains in its initial setting around the initial chain 14, an unnecessary play may be created in the area in the lowered portion 14L, which could destabilize the product-delivery movement. For this reason, the adapters 17 according to the length of the products to be sold are fitted on the link segments 14b in the lowered portion 14L to fill the above-mentioned play, thereby stabilizing the product-delivery movement. In addition, if the adapters 17 are applied to fill the entire length of the lowered portions 14L to thereby make the height of the circumference of the chain 14 equivalent to that of the raised portions 14H, long products 5 can be sold by using a single row in the manner shown in FIG. 6.

It goes without saying that the products that can be sold in automatic vending machines need not be limited to only cigarettes, but may also include all other box products.

According to the present invention, as described above, the product-delivery device that delivers the products by using a horizontal conveyer mechanism rather than a conventional pusher-type vending mechanism has the following effects:

(1) Products that are stacked and accommodated in a product-accommodating box can all be delivered in the same direction through a product-delivery opening in front of the product-accommodating box in a multi-raw vending mechanism in which the accommodated products are lined up in more than two rows in the product-accommodating box as well as in a single-row vending mechanism. Moreover, it is not necessary to ensure an extra space behind the product-accommodating box, i.e. an escape space provided for the pusher in the pusher-type vending mechanism. Thus, the depth of an automatic vending machine can be kept to a minimum, to make the machine much thinner.

(2) The horizontal conveyer mechanism has a simpler structure than the pusher-type vending mechanism, and the dimensions are small and thin. Also, it is possible to completely sell all the products accommodated in the product-accommodating box by using the combination of a product-delivery detection switch and an operation detection switch as described in the embodiments. Thus, the product accommodation efficiency is greatly increased.

(3) In particular, in the tri-row vending mechanism in which the products are accommodated in the product-accommodating box in the three rows, the number of the accommodated products can increase 1.5 times more than the conventional automatic vending machines in the same depth.

(4) In addition, in the multi-row vending mechanism having a plurality of belt conveyers, the rear belt conveyer is set slightly lower than the front belt conveyer, or in a single belt conveyer, the raised and lowered portions are formed on the circumference of the conveyer according to the size of the product. The products placed in the back row can be delivered in a predetermined order by changing the position of the products to a sales standby position in the front row without causing the products to stick to each other and stopping their delivery.

(5) Furthermore, by combining a height-adjustment adapter with a link segment that demarcates the lowered portion in the circumference of the chain conveyer mechanism, the products of different sizes, i.e. long and short, can be handled easily to thereby increase the flexibility of the product-delivery device.

What is claimed is:

1. A product-delivery device for an automatic vending machine for delivering products stacked and accommodated in a product-accommodating box sequentially from a lowest position according to a sales command, comprising:

at least one horizontal conveyer installed on a lower side of the product-accommodating box and having a size to substantially support the products thereon so that said products are directly piled on and supported by said conveyer; and a product delivery opening formed at a lower front part of the product-accommodating box and having a size to allow one of the products to pass therethrough so that the products disposed on the conveyer are delivered forward one by one from the product-accommodating box by means of the conveyer according to the sales command.

2. A product-delivery device according to claim 1, wherein said products are stacked and accommodated at least two rows along a longitudinal direction of the conveyer, said conveyer having means to deliver the products piled on at least two rows along the conveyer one by one to the delivery opening.

3. A product-delivery device according to claim 2, wherein a plurality of the belt conveyers is formed to orient serially so that each belt conveyer is located under each row of the products.

4. A product-delivery device according to claim 3, wherein the belt conveyers adjacent to each other are arranged to have a difference in height so that a belt surface in a backward position is slightly lower than a belt surface in a forward position.

5. A product-delivery device according to claim 1, further comprising a sold-out detection switch formed at the product delivery opening, said sold-out detection switch including an actuator having a vertical posture in an arbitrary position.

6. A product-delivery device according to claim 1, further comprising a delivery-detection switch formed near the product delivery opening, said delivery-detection switch including an actuator having a horizontal posture in an arbitrary position.

7. A product-delivery device according to claim 2, wherein said conveyer includes a raised portion and a lowered portion on a circumference thereof, said raised and lowered portions having lengths corresponding to lengths of the products.

8. A product-delivery device according to claim 7, wherein the conveyer is a belt conveyer mechanism having a belt, said raised portion having a thickness in the belt greater than a thickness of the lowered portion in the belt.

9. A product-delivery device according to claim 7, wherein the conveyer is a chain conveyer mechanism having a chain with link segments, said raised portion and the lowered portion being formed on a circumference of the chain by changing height of link segments.

10. A product-delivery device according to claim 7, further comprising a delivery-detection switch and a sold-out detection switch having actuators protruding from a product-delivery end face and a product-loading face relative to the conveyer.

11. A product-delivery device according to claim 7, further comprising an elastic plate decelerator formed in the product delivery opening to decrease a speed of the product delivered by the conveyer.

12. A product-delivery device according to claim 9, wherein said chain conveyer mechanism further includes height-adjusting adapters to be attached to the lowered portion so that a length of the raised and lowered portions can be set variably to match sizes of the products.

13. A product-delivery device according to claim 1, wherein said conveyer has a length substantially corresponding to a length of one of the products to be delivered.

* * * * *